US007131539B2

(12) United States Patent
Mukai

(10) Patent No.: US 7,131,539 B2
(45) Date of Patent: Nov. 7, 2006

(54) PAPER SHEETS CORNER FOLD DETECTION METHOD AND PAPER SHEETS CORNER FOLD DETECTION PROGRAM

(75) Inventor: Masanori Mukai, Tokyo (JP)

(73) Assignees: Fujitsu Limited, Kawasaki (JP); Fujitsu Frontech Limited, Tokyo (JP)

( * ) Notice: Subject to any disclaimer, the term of this patent is extended or adjusted under 35 U.S.C. 154(b) by 0 days.

(21) Appl. No.: 11/046,779

(22) Filed: Feb. 1, 2005

(65) Prior Publication Data

US 2005/0133990 A1 Jun. 23, 2005

Related U.S. Application Data

(63) Continuation of application No. PCT/JP02/08813, filed on Aug. 30, 2002.

(51) Int. Cl.
*B07C 5/00* (2006.01)
*B65H 7/00* (2006.01)
*G01V 8/00* (2006.01)
*G06K 9/00* (2006.01)
*G07F 7/04* (2006.01)

(52) U.S. Cl. ...................... 209/534; 271/259; 271/262; 271/263; 250/559.42; 250/559.45; 382/135; 194/206; 194/207; 194/212; 194/335

(58) Field of Classification Search ........... 271/258.01, 271/259, 262, 263, 186, 65, 291, 298; 194/206, 194/207, 212, 335; 250/559.4, 559.42, 559.44, 250/559.45, 221, 222.1; 382/135; 209/534
See application file for complete search history.

(56) References Cited

U.S. PATENT DOCUMENTS 4,298,807 A * 11/1981 Favre ...................... 250/559.1
4,429,991 A * 2/1984 Williams ...................... 356/73
4,462,587 A * 7/1984 Graef et al. ................ 271/263
4,529,318 A * 7/1985 Curl ........................... 356/430
4,623,975 A * 11/1986 Kagami ...................... 356/638
5,174,562 A * 12/1992 Mizunaga et al. .......... 271/261
5,751,841 A * 5/1998 Leong et al. .............. 382/137

(Continued)

FOREIGN PATENT DOCUMENTS

JP 63-82257 4/1988
JP 7-14048 1/1995
JP 2994137 12/1999
JP 2000-82164 3/2000

(Continued)

OTHER PUBLICATIONS

Chinese Patent Office Action for corresponding Chinese patent application No. 028295242 dated Apr. 14, 2006.
Korean Patent Office Action for corresponding Korean patent application No. 10-2005-7001959 dated Apr. 27, 2006.

*Primary Examiner*—Gene O. Crawford
*Assistant Examiner*—Matthew J. Kohner
(74) *Attorney, Agent, or Firm*—Staas & Halsey LLP

(57) ABSTRACT

When a thickness sensor detects a corner fold in a front end part of the paper sheet being carried, a light sensor checks whether a break exists or not in the front end part. When there is no break, it means the thickness sensor does not detect a corner fold but a foreign matter such as a tape mending a break. When there is a break, it means the thickness sensor detects a corner fold in the front end part. When there is no corner fold, the light sensor checks the front end part. When there is a break, it means there is a corner break but no corner fold in the front end part. When there is no break, it is a normal state. Regarding the back end part, a corner fold is detected in similarly to the foregoing.

13 Claims, 11 Drawing Sheets

U.S. PATENT DOCUMENTS

| | | | | | |
|---|---|---|---|---|---|
| 5,853,089 | A * | 12/1998 | Milne | ......................... | 209/534 |
| 6,741,727 | B1 * | 5/2004 | Hirasawa | .................... | 382/112 |
| 6,912,297 | B1 * | 6/2005 | Scott et al. | ................. | 382/112 |

FOREIGN PATENT DOCUMENTS

| | | |
|---|---|---|
| JP | 4-242883 | 8/1992 |
| JP | 5-338856 | 12/1993 |

* cited by examiner

PAPER SHEETS CORNER FOLD DETECTION METHOD AND PAPER SHEETS CORNER FOLD DETECTION PROGRAM

CROSS REFERENCE TO RELATED APPLICATION

This application is a continuation of an International Application No. PCT/JP02/08813, which was filed on Aug. 30, 2002.

BACKGROUND OF THE INVENTION

1. Field of the Invention

The present invention relates to a paper sheets corner fold detection method and a paper sheets corner fold detection program for surely detecting a minute corner fold arising in the corner part of a paper sheet in a paper sheets processor as an end part corner fold of the paper sheet without misidentifying it as a mending or a break, and separately accommodating the paper sheet wherein the corner fold arises in an accommodation part so that double feed is not caused by the corner fold in the next running-out time.

2. Description of the Related Art

Conventionally, there has been a paper sheets processor for automatically accommodating paper sheets. As a representative example, there is an automated-teller machine, which is installed in banks, post offices, convenience stores and the like, and which automatically performs processes such as accommodating deposit banknotes inserted from outside into a banknote pay-in/out slot or paying withdrawal banknotes.

In such an automated-teller machine, when a customer inserts banknotes into the banknote pay-in/out slot of the automated-teller machine, the inserted banknotes are provided with image recognition by a judgment part in the middle of a carrying route, and then automatically provided with denomination identification and other necessary judgment processes. After that, the number of the banknotes is counted, and then the banknotes are accommodated in a given banknote accommodation vessel.

Further, when a customer withdraws a desired amount of money, the customer inputs intention of cash withdrawal and the withdrawal amount of money from an input operation panel of the automated-teller machine. After that, banknotes corresponding to the desired amount of money are paid out from the banknote pay-in/out slot.

Then, the number of paid-out banknotes is counted while the banknotes are run out from the foregoing banknote accommodation vessel, and carried on the carrying route connected to the banknote pay-in/out slot. However, in this process, there has been a large problem.

First, deposit banknotes inserted into the banknote pay-in/out slot of the automated-teller machine are not always inserted into the banknote pay-in/out slot in a state that all the banknotes are orderly folded out. Some customers roughly insert a banknote wherein a fold arises in the corner part without correctly folding out the corner fold. Apart from the inserted banknote is a forged banknote, in case of the inserted banknote is a true banknote, it is not possible to return the true banknote to the customer (carry back to the banknote pay-in/out slot) due to just the corner fold. That is, the banknote with the corner fold is accommodated as it is.

FIG. 10 is a view showing a model of an example of a banknote wherein such a corner fold arises. A portraiture 21 of a person which is vertically and horizontally distinguishable at a glance is printed at the right side on a surface of a banknote 20 shown in the same figure. Further, in the example shown in the same figure, a small corner fold 22 which is folded down to the other side of the figure arises in the upper left corner. Such a small corner fold 22 often has dimension a in the longitudinal direction of about from 30 to 50 mm (millimeter) and dimension b in the lateral direction of about from 3 to 5 mm.

Aside from a large corner fold, such a relatively small corner fold as above arises in a margin in an edge part wherein no printing is provided. Therefore, the corner fold cannot be recognized by color. When trial is made to determine the corner fold by image recognition based on measurement by the judgment part, it is difficult to determine whether the corner part is torn or folded. Therefore, in any event, such a small corner fold is ignored as a very small defect, and accommodated in the banknote accommodation vessel as it is.

However, if the foregoing corner fold arises in the banknote, when banknotes are run out from the banknote accommodation vessel and paid out through the banknote pay-in/out slot in banknote withdrawal, or when the number of banknotes is counted while the banknotes are run out from the banknote accommodation vessel after, for example, the banknote accommodation vessel is taken out from the automated-teller machine for replacement and returned back to a home office, troubles have been often caused in the banknote automated counter.

FIG. 11 is a view for explaining the trouble caused by the corner fold banknote in running out the banknote as described above. As shown in the same figure, when trial is made so that the banknote 20 and a banknote **20*n* are sequentially run out in the running-out direction indicated by arrow A of the figure from an unshown accommodation vessel, if the foregoing corner fold 22 arises in the back end corner of the upper banknote 20 in the running-out direction, corner 20*n*-1 of the lower banknote 20*n* is hooked by the corner fold 22 part, and therefore, the banknote 20*n* is run out together with the banknote 20** in the direction of the arrow A. That is, it increases the likelihood that the problem of double feed running-out might be caused.

When such a double feed running-out is caused, there has been a problem that a carrying jam is caused on the carrying route leading to stop of the automated-teller machine, or a trouble in operation of the process for measuring the number of accommodated banknotes in the home office of the banck.

In view of the foregoing conventional actual circumstances, it is a task of the invention to provide a paper sheets corner fold detection method and a paper sheets corner fold detection program capable of surely detecting a minute corner fold arising in the corner part of a paper sheet, and accommodating the paper sheet in an accommodation part so that double feed is not caused by the corner fold in the next paper sheets running-out time.

SUMMARY OF THE INVENTION

First, a paper sheets corner fold detection method in an embodiment of the invention is a paper sheets corner fold detection method in a paper sheets processor, comprising: a carrying-in sensor part for being started by input operation from outside to a transaction start switch part and detecting insertion of a paper sheet inserted from outside for transaction; a light sensor part for detecting light reflective characteristics or light transmissive characteristics of the paper sheet, which passes the carrying-in sensor part and is carried; and a thickness sensor part for detecting a thickness change of the paper sheet, which passes the carrying-in sensor part and is carried, comprising:

an image processing step for image-processing a detection output value from the light sensor part by an image processing part;

an image corner fold determination step for determining whether a corner fold exists or not in the front end part or the back end part of the paper sheet in the carrying direction based on image data processed by the image processing step;

a thickness corner fold determination step for determining whether a corner fold exists or not in the front end part or the back end part of the paper sheet in the carrying direction based on a detection output value from the thickness sensor part; and a paper sheets corner fold determination step for determining whether a corner fold exists or not in the front end part or the back end part of the paper sheet in the carrying direction based on the image corner fold determination step and the thickness corner fold determination step.

This paper sheets corner fold determination method further comprises a control step for controlling ejection carrying of the paper sheet so that the paper sheet is separately accommodated in a reusable accommodation part, a pre-accommodation inversion part, or an unusable accommodation part according to a region where a corner fold exists when it is confirmed that the corner fold exists in the paper sheet in the paper sheets corner fold determination step.

In this case, when the corner fold of the paper sheet confirmed in the paper sheets corner fold determination step is located in a region wherein double running-out is not caused by the corner fold when the paper sheet is run out from the reusable accommodation part in the next time, the ejection carrying is controlled so that the paper sheet is accommodated in the reusable accommodation part as it is in the control step. Further, for example, when the corner fold of the paper sheet confirmed in the paper sheets corner fold determination step is located in a region wherein double running-out may be caused by the corner fold when the paper sheet is run out from the reusable accommodation part the next time, the ejection carrying is controlled so that the paper sheet is accommodated through the pre-accommodation inversion part into the reusable accommodation part in the control step. Further, for example, when the corner fold of the paper sheet confirmed in the paper sheets corner fold determination step is located in both the front end part and the back end part of the paper sheet in the carrying direction, the ejection carrying is controlled so that the paper sheet is accommodated in the unusable accommodation part in the control step.

It is preferable that the reusable accommodation part is constructed from a stacker or a cassette.

Next, a paper sheets corner fold detection program in the embodiment of the invention is a paper sheets corner fold detection program for making a computer execute a paper sheets corner fold detection process in a paper sheets processor, comprising: a carrying-in sensor part for being started by input operation from outside to a transaction start switch part and detecting insertion of a paper sheet inserted from outside for transaction; a light sensor part for detecting light reflective characteristics or light transmissive characteristics of the paper sheet, which passes the carrying-in sensor part and is carried; and a thickness sensor part for detecting a thickness change of the paper sheet, which passes the carrying-in sensor part and is carried, which makes the computer execute:

a process for image-processing a detection output value from the light sensor part by an image processing part;

an image corner fold determination process for determining whether a corner fold exists or not in the front end part or the back end part of the paper sheet in the carrying direction based on image data processed by the said process;

a thickness corner fold determination process for determining whether a corner fold exists or not in the front end part or the back end part of the paper sheet in the carrying direction based on a detection output value from the thickness sensor part; and a paper sheets corner fold determination process for determining whether a corner fold exists or not in the front end part or the back end part of the paper sheet in the carrying direction based on the image corner fold determination process and the thickness corner fold determination process.

This paper sheets corner fold detection program further makes the computer execute a control process for controlling ejection carrying of the paper sheet so that the paper sheet is separately accommodated in a reusable accommodation part, a pre-accommodation inversion part, or an unusable accommodation part according to a region where a corner fold exists when it is confirmed that the corner fold exists in the paper sheet in the paper sheets corner fold determination process.

In this case, the paper sheets corner fold detection program makes the computer execute a process for controlling the ejection carrying so that the paper sheet is accommodated in the reusable accommodation part as it is in the control process when the corner fold of the paper sheet confirmed in the paper sheets corner fold determination process is located in a region wherein double running-out is not caused by the corner fold when the paper sheet is run out from the reusable accommodation part the next time. Further, for example, the paper sheets corner fold detection program makes the computer execute a process for controlling the ejection carrying so that the paper sheet is accommodated through the pre-accommodation inversion part into the reusable accommodation part in the control process when the corner fold of the paper sheet confirmed in the paper sheets corner fold determination process is located in a region wherein double running-out may be caused by the corner fold when the paper sheet is run out from the reusable accommodation part in the next time. Further, for example, the paper sheets corner fold detection program makes the computer execute a process for controlling the ejection carrying so that the paper sheet is accommodated in the unusable accommodation part in the control process when the corner fold of the paper sheet confirmed in the paper sheets corner fold determination process is located in both the front end part and the back end part of the paper sheet in the carrying direction.

As described above, according to the invention, paper sheets are measured by combining the light sensor and the thickness sensor. Therefore, an actual corner fold and a region thereof are surely detected by discriminating the corner fold from a mending place which is easily misidentified as a corner fold by the thickness sensor and discriminating the corner fold from a break place which is easily misidentified as a corner fold by the light sensor. Thereby, waste of misidentifying as a corner fold and subsequently performing useless processes is avoided. Further, it becomes possible to easily address a trouble which might be caused by the actual corner fold.

Further, even a minute corner fold and a region where the corner fold arises are surely detected. Therefore, when there is the corner fold on the end side wherein double feed might be caused when the paper sheet is run out from an accommodation part in the next time, it is possible to perform inversion of orientation of the corner fold paper sheet before the paper sheet is accommodated in the accommodation part. Thereby, double feed in the next running-out time from the accommodation part is not caused, cause of a trouble such as jam during carriage is resolved, and operation efficiency of the paper sheets processing is improved.

DESCRIPTION OF THE PREFERRED EMBODIMENTS

Descriptions will be hereinafter given of an embodiment of the present invention with reference to the drawings.

Figure 1:
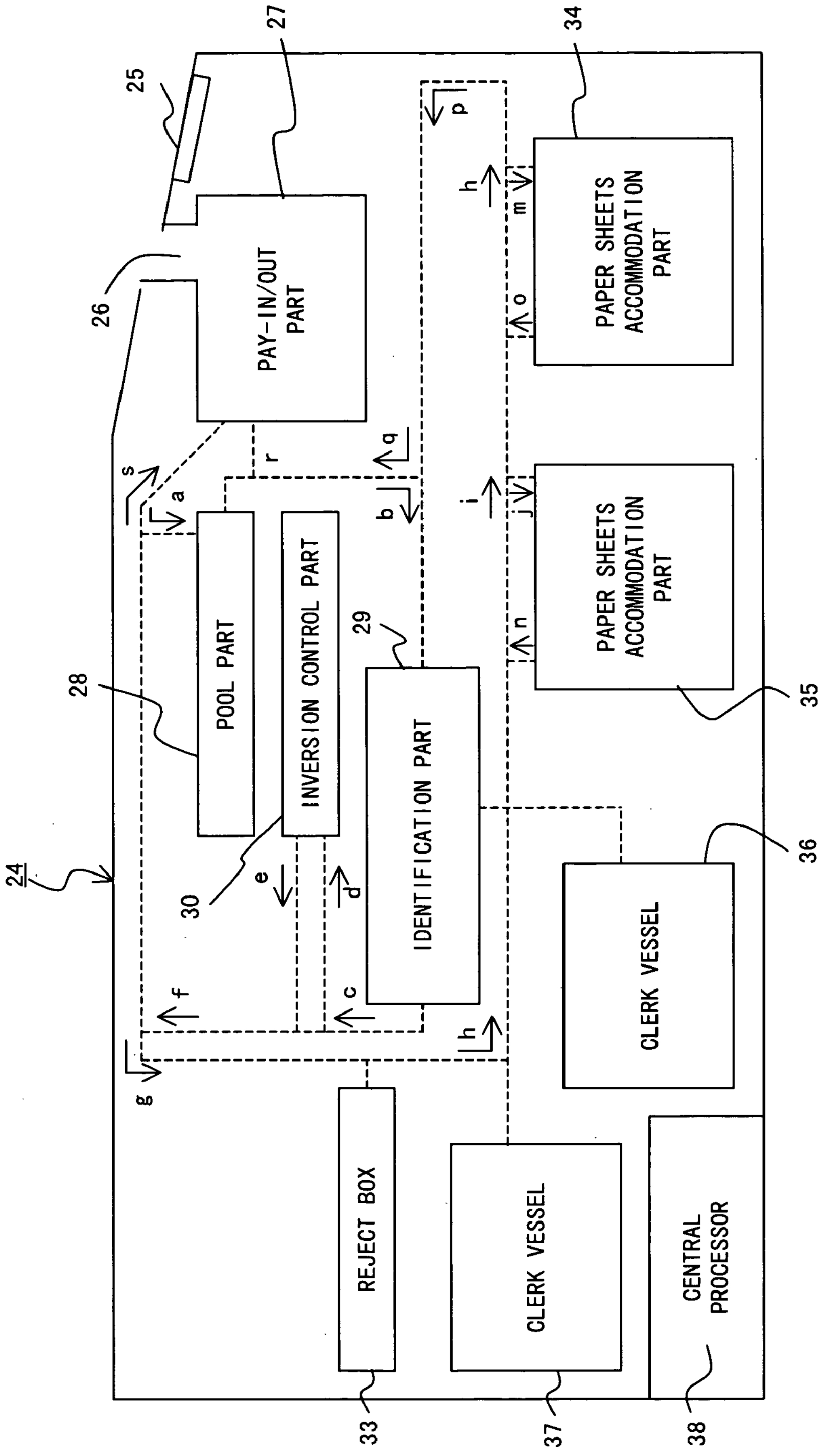
FIG. 1 is a lateral cross section showing a model of a construction of a paper sheets processor in an embodiment.

FIG. 1 is a lateral cross section showing a model of a construction of a paper sheets processor in the embodiment. A paper sheets processor 24 shown in the same figure shows a construction similar to that of an automated-teller machine used for customers in banks or the like.

The paper sheets processor 24 shown in the same figure comprises an input operation panel switch part 25 on the top thereof which is located on the front of the processor (right in the figure) and is formed aslope slightly. In the paper sheets processor 24, a pay-in/out slot 26, through which customers pay in or out paper sheets from outside, a pay-in/out part 27 linked with this pay-in/out slot 26, a pool part 28 interlinked with this pay-in/out part 27 through a paper sheets carrying route shown by a dotted line in the figure, a judgment part 29, an inversion control part 30, a reject box 33, a paper sheets accommodation part 34, a paper sheets accommodation part 35, a clerk vessel 36, a clerk vessel 37, and a central processor 38 are provided.

The foregoing input operation panel switch part 25 is a man-machine interface between a customer and the paper sheets processor 24. The input operation panel switch part 25 comprises an input switch, with which a customer inputs intention that the customer is to make transaction of paper sheets such as withdrawal or deposit of the paper sheets. The input switch can be, for example, a button switch arranged in the vicinity of an display device (not shown in the figure) or can be a touch type input device arranged by being superimposed on the display device.

The foregoing paper sheets accommodation parts 34 and 35 are constructed from a stacker, a cassette or the like for accommodating reusable paper sheets among paper sheets inserted from the pay-in/out slot 26 by customers.

Further, in linkage parts between the carrying route shown by dotted lines of the figure and the respective component parts, switching devices not shown in the figure are respectively arranged. These switching devices can switch carrying directions to the direction to pass the paper sheet in the middle of carriage or the direction to accommodate the paper sheet in the middle of carriage into the component part under the control of the central processor 38.

As a whole, a construction and functions of the paper sheets processor 24 in this example are different from those of conventionally known paper sheets processors in terms of an internal construction of the judgment part 29, an arrangement of the inversion control part 30, and processing contents of the central processor 38, which will be described later in detail.

In FIG. 1, when paper sheets are deposited, the paper sheets inserted from the pay-in/out slot 26 by a customer are temporarily retained in the pay-in/out part 27, and then taken off one by one and temporarily accommodated in the pool part 28 as indicated by arrow a.

When the number of paper sheets or an amount of money counted during the foregoing takeoff corresponds with the number of paper sheets or an amount of money input from the input operation panel switch part 25 by a customer, the paper sheets temporarily accommodated in the pool part 28 are taken off one by one from the inferior part of the pool part 28, and carried to the judgment part 29 as indicated by arrow b of the figure. Authenticity, stain, a corner fold and the like thereof are determined while the paper sheets pass through the judgment part 29. The determination result by this judgment part 29 is notified to the central processor 38.

The central processor 38 carries the paper sheet which passed the judgment part 29 after inversing the paper sheet by using a switchback mechanism, not particularly shown in the figure, of the inversion control part 30 as indicated by arrows d and e if the paper sheet needs to be inverted based on the foregoing notification in the middle of carriage on the carrying route as indicated by arrows c, f, g, h, i, or k. In the meantime, if the paper sheet is a forged paper sheet, the central processor 38 carries back the paper sheet from the arrow f through arrow s to the pay-in/out part 27.

Further, when the foregoing notification shows that the paper sheet is not a forged paper sheet, but has a large stain or the like, which might cause troubles in future usage, and therefore, the paper sheet needs to be changed to usable other paper sheet, the paper sheet is also carried back from the arrow f through the arrow s to the pay-in/out part 27.

When paper sheets accommodated in the paper sheets accommodation part 34 or 35 are judged by passing them through the judgment part 29 in batch processing, the central processor 38 carries the paper sheet from the arrow f through the arrow g when a notification from the judgment part 29 shows that the paper sheet is a forged paper sheet. Meanwhile, regarding defective paper sheets such as forged paper sheets and paper sheets with a large stain, the central processor 38 switches the switching device of the reject box 33 to a carrying-in side to accommodate these defective paper sheets in the reject box 33, or carries these defective paper sheets back to the pay-in/out part from the arrows c and f through the arrow s as indicated in the figure.

When the paper sheets inserted into the pay-in/out part 27 by the customer as above pass the judgment part 29, and the judgment result shows that the paper sheets are not forged paper sheets or paper sheets with a large stain, after the paper sheets required to be inverted are inverted, the central processor 38 carries the paper sheets as indicated by the arrows c, f, g, h, and i, switches the switching device to arrow j side, and accommodates the paper sheets in the paper sheets accommodation part 35, or carries the paper sheets as indicated from the arrow i through the arrow k, switches the switching device to arrow m side, and accommodates the paper sheets in the paper sheets accommodation part 34.

When the paper sheet accommodated as above is run out from the paper sheet accommodation part 34 or 35 the next time, the paper sheet is run out in the same direction as the carrying direction when accommodated as indicated by arrow n or arrow o. That is, the back part of the paper sheet in the carrying direction when accommodated becomes the back part in the carrying direction when the paper sheet is run out as it is.

Figure 10:
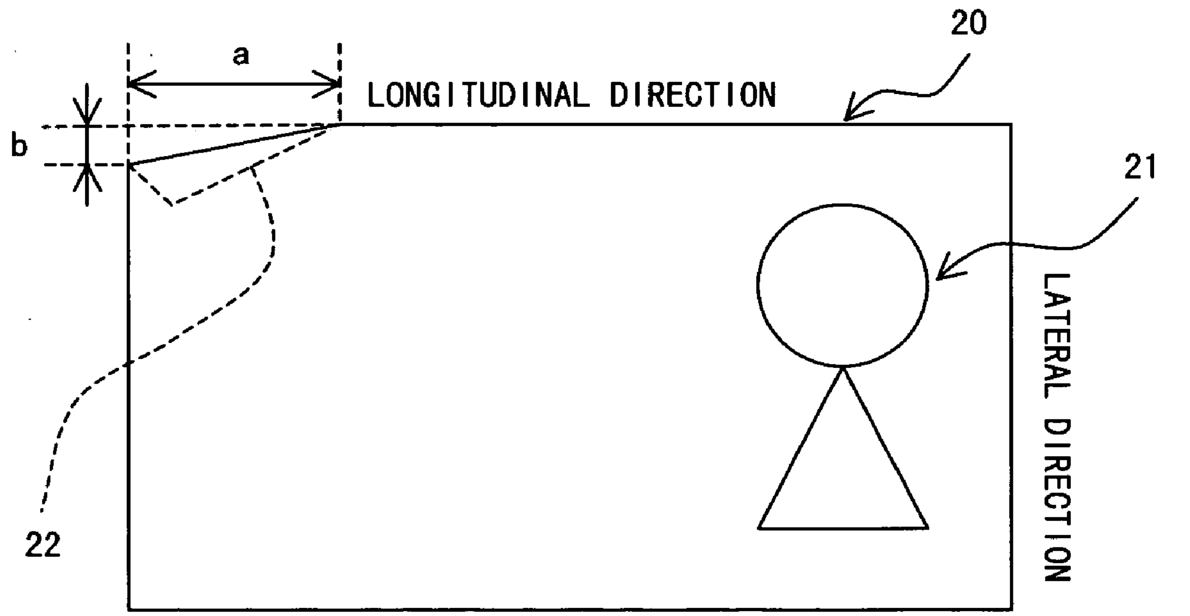
FIG. 10 is a view showing a model of a conventional example of a banknote wherein a corner fold arises.
Figure 11:
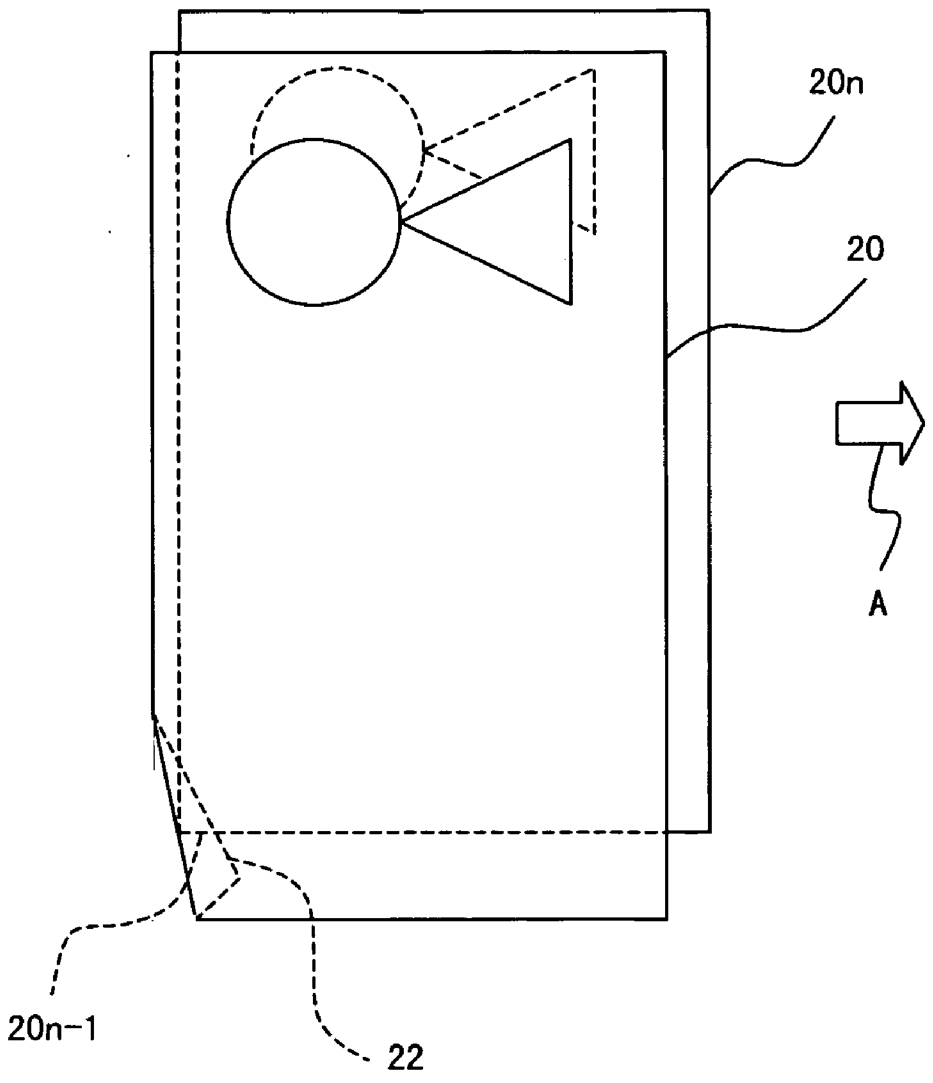
FIG. 11 is a view explaining the conventional trouble caused by a corner fold banknote when the banknote is run out.

Therefore, when the corner fold as shown in FIG. 10 exists in the back part of a paper sheet in the carrying direction when the paper sheet is accommodated, it is possible that double feed as shown in FIG. 11 is caused when the paper sheet is run out. In this example, as described below, such possibility of double feed is cut down.

Figure 2:
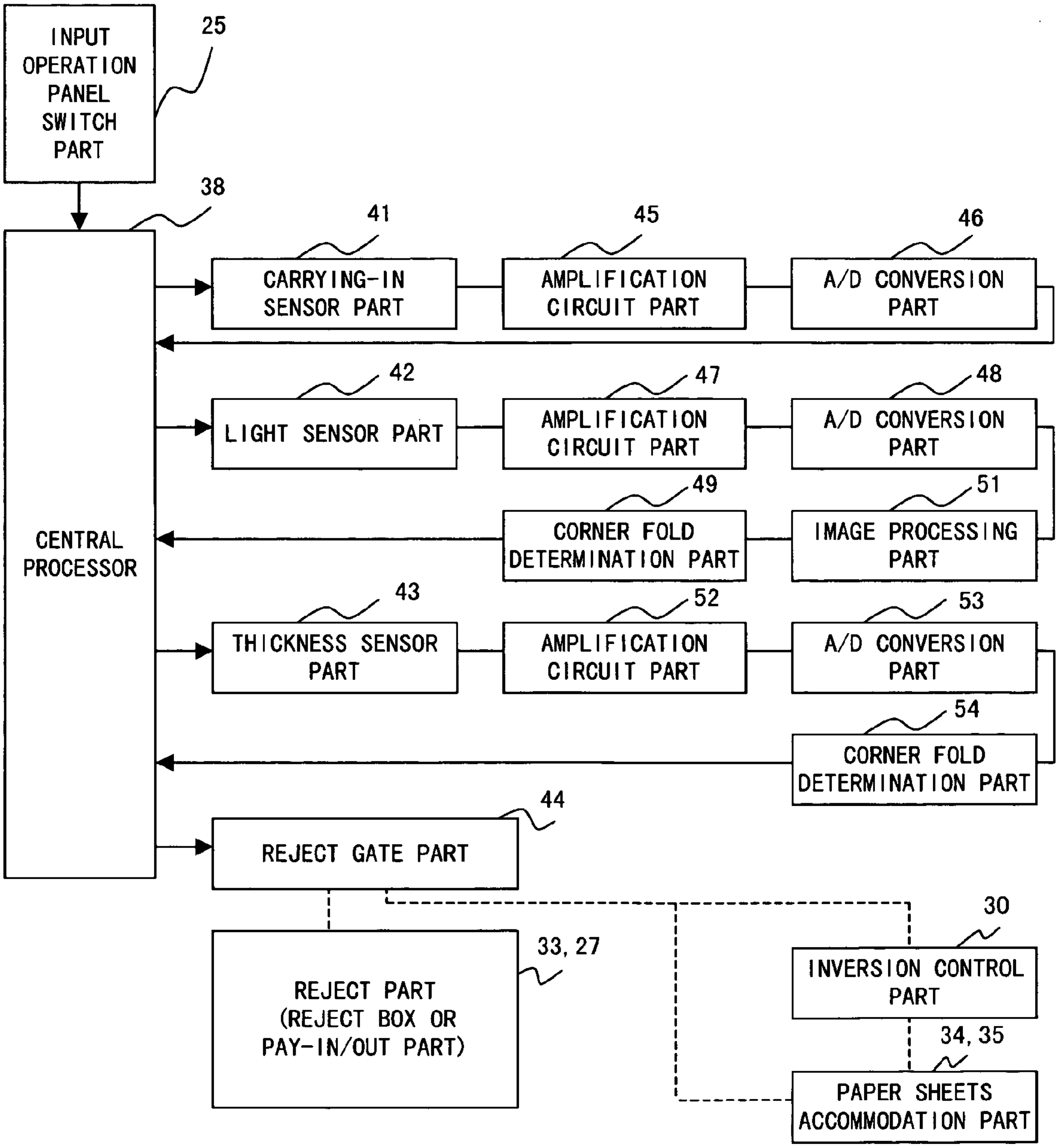
FIG. 2 is a block diagram showing the construction of a processing system with central focus on a central processor of the paper sheets processor in the embodiment.

FIG. 2 is a block diagram showing the construction of the processing system centering on the central processor 38 of the foregoing paper sheets processor 24. In FIG. 2, for the same component parts as the component parts shown in FIG. 1 are affixed with the same numbers as in FIG. 1. In the processing system shown in FIG. 2, in addition to the input operation panel switch part 25 shown in FIG. 1, a carrying-in sensor part 41, a light sensor part 42, a thickness sensor part 43, and a reject gate part 44 are connected to the central processor 38. Though described later in detail, the foregoing carrying-in sensor part 41, the light sensor part 42, and the thickness sensor part 43 are arranged together with a carrying-out sensor part in the judgment part 29 of FIG. 1.

An amplification circuit part 45 and an A/D conversion part 46 are connected to the foregoing carrying-in sensor part 41 in series. An output from the A/D conversion part 46 is fed back to the central processor 38. Further, an amplification circuit part 47, an A/D conversion part 48, an image processing part 51, and a corner fold determination part 49 are connected to the foregoing light sensor part 42 in series. An output from the corner fold determination part 49 is fed back to the central processor 38.

Further, an amplification circuit part 52, an A/D conversion part 53, and a corner fold determination part 54 are connected to the thickness sensor part 43 in series. An output from the corner fold determination part 54 is fed back to the central processor 38.

The reject gate part 44 controls switching of carrying routes to the reject part (reject box 33 or pay-in/out part 27), switching of carrying routes to the inversion control part 30, or switching of carrying routes to the paper sheets accommodation parts 34 and 35.

In the foregoing construction, when the central processor 38 receives an input operation event directing transaction start from the foregoing input operation panel switch part 25, the central processor 38 turns an not-shown carrying motor to start carrying paper sheets to be inserted from the pay-in/out slot 26 into the pay-in/out part 27 of FIG. 1 by a customer.

The carrying-in sensor part 41 is constructed from light reflective or light transmissive at least two single light sensors. The carrying-in sensor part 41 detects that the front end part of the paper sheet in the carrying direction is carried into the judgment part 29. This detection signal is input to the amplification circuit 45, amplified at a given ratio by the amplification circuit 45, which is output to the A/D conversion part 46. The A/D conversion part 46 converts the input paper sheet detection analog signal to a digital signal, and outputs this converted paper sheet detection digital signal to the central processor 38.

The light sensor part 42 is a line sensor constructed from a minute light sensor device array. A line length thereof corresponds to the maximum width in the direction perpendicular to the carrying direction of the paper sheet passing the judgment part 29. The light sensor part 42 segmentalizes a whole area of the paper sheet passing the judgment part 29 into minute regions, and measures the minute regions in the main scanning direction along the line direction of the sensor. Further, in sync with carrying operation of the paper sheet, the light sensor part 42 repeats the foregoing main scanning measurement in the carrying direction of the paper sheet, that is, in the sub-scanning direction.

Measurement data by this light sensor part 42 is input to the amplification circuit 47, amplified by the amplification circuit 47 at a given ratio output to the A/D conversion part 48. The A/D conversion part 48 converts the input paper sheet face measurement analog data to digital data, and outputs this converted paper sheet face measurement digital data to the image processing part 51.

The image processing part 51 provides image data of the paper sheet shown by the digital data with various image processing such as skewing correction, concentration correction, and origin correction, and outputs this digital data after image processing to the corner fold determination part 49.

Though not particularly shown, the corner fold determination part 49 comprises a memory device, in which template files for respective paper sheets are stored. The paper sheet data in this template file and the paper sheet data shown by the measured digital data are compared with each other to determine presence of a corner fold. The corner fold determination result is output to the central processor 38.

The thickness sensor part 43 is constructed from a thickness detection roller having a length corresponding to a width of an appropriate margin in addition to the maximum width in the direction perpendicular to the carrying direction of the paper sheet passing the judgment part 29, and two angle sensors arranged at both ends of the thickness detection roller. When the thickness of the paper sheet passing the judgment part 29 is changed, a slant of the foregoing thickness detection roller corresponding to the thickness change is detected (measured) by the two angle sensors as a slant variation.

The analog data obtained by measuring the thickness variation from these two angle sensors, that is, the thickness sensor part 43 is input to the amplification circuit 52, amplified at a given ratio by the amplification circuit 52, which is output to the A/D conversion part 53. The A/D conversion part 53 converts the input thickness measurement analog data to digital data, and outputs this converted thickness measurement digital data to the corner fold determination part 54.

Based on wave form of the digital data input from the A/D conversion part 53, the corner fold determination part 54 determines presence of a corner fold, and outputs the corner fold determination result to the central processor 38.

When the central processor 38 recognizes that a paper sheet is carried into the judgment part 29, based on the paper sheet detection digital signal from the carrying-in sensor part 41, which is input through the A/D conversion part 46, the central processor 38 activates the light sensor part 42 and the thickness sensor part 43, and performs sampling of sensor measurement data for the required number of times.

The sampling data of the light sensor part 42 and the thickness sensor part 43 are, as described above, amplified at the amplification circuits, converted to digital data at the A/D converters, and finally input to the central processor 38 as a corner fold determination result through the corner fold determination parts 49 and 54 respectively. Based on the input corner fold determination result, the central processor 38 controls the reject gate part 44.

Based on the control from the central processor 38, the reject gate part 44 performs direction switching of the direction switching device on the carrying route to the reject part (reject box 33 or pay-in/out part 27), direction switching of the direction switching device on the carrying route to the inversion control part 30, and direction switching of the direction switching device on the carrying route to the paper sheets accommodation parts (paper sheets accommodation part 34 or 35) among the carrying direction switching devices on the carrying route of the paper sheets.

That is, when a corner fold is detected at the corner fold determination part 49 or 54, direction of the direction switching device is switched as follows: the paper sheet is carried to the reject part (33 or 27) in the case of corner folds in both ends, the paper sheet is carried to the paper sheets accommodation part (34 or 35) in the case of a corner fold only in the front end, and the paper sheet is firstly carried to the inversion control part 29 once, and then carried from the inversion control part 29 to the paper sheets accommodation part (34 or 35) in the case of a corner fold only in the back end.

Forged paper sheets or paper sheets with a large stain or the like, which might cause trouble in future usage are not herein described, since these paper sheets are not within the scope of the invention.

Figure 3:
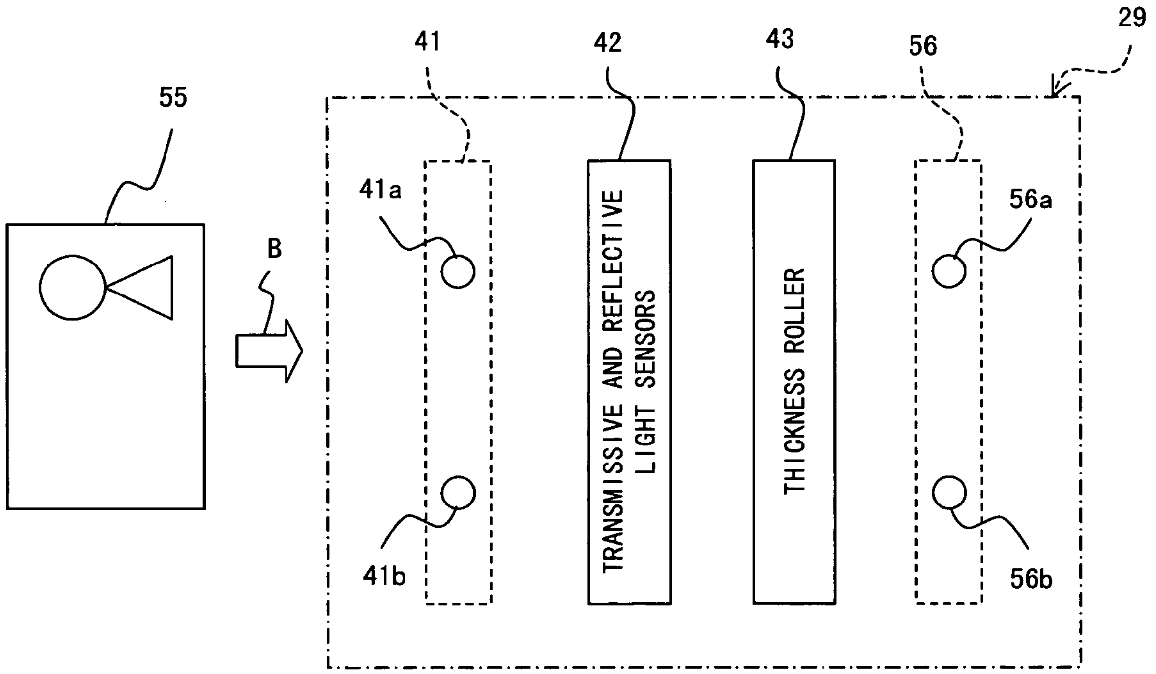
FIG. 3 is a view showing a model of a construction of a judgment part of the paper sheets processor in the embodiment.

FIG. 3 is a view showing a model of a construction of the inside of the judgment part 29 of the foregoing paper sheets processor 24. As shown in FIG. 3, this judgment part 29 is provided with the following components in the order of the carrying direction of the paper sheet 55 indicated by arrow B: the carrying-in sensor part 41 shown in FIG. 2 constructed from two light sensors 41*a* and 41*b* arranged at a given interval; the light sensor part 42 shown in FIG. 2 arranged ahead of this carrying-in sensor part 41 in the carrying direction, constructed from a transmissive light sensor and a reflective light sensor; the thickness sensor part 43 shown in FIG. 2 arranged ahead of this light sensor part 42 in the carrying direction, constructed from the thickness roller and the not shown two angle sensors at both ends thereof; and a carrying-out sensor part 56 not shown in FIG. 2 arranged ahead of this thickness sensor part 43 in the carrying direction (foremost part of the judgment part 29 in the carrying direction), which is constructed from two light sensors 56*a* and 56*b* arranged at a given interval.

The foregoing carrying-out sensor part 56 detects that the back end part of the paper sheet 55 in the carrying direction is carried out from the judgment part 29 to outside (right in the figure). The carrying-in sensor part 41 and the carrying-out sensor part 56 are not necessary to be the light sensor. For example, the carrying-in sensor part 41 and the carrying-out sensor part 56 can be constructed from a sensor formed by, for example, a combination of a rotational pin and a switching circuit, which mechanically detects presence of the paper sheet 55.

Figure 4:
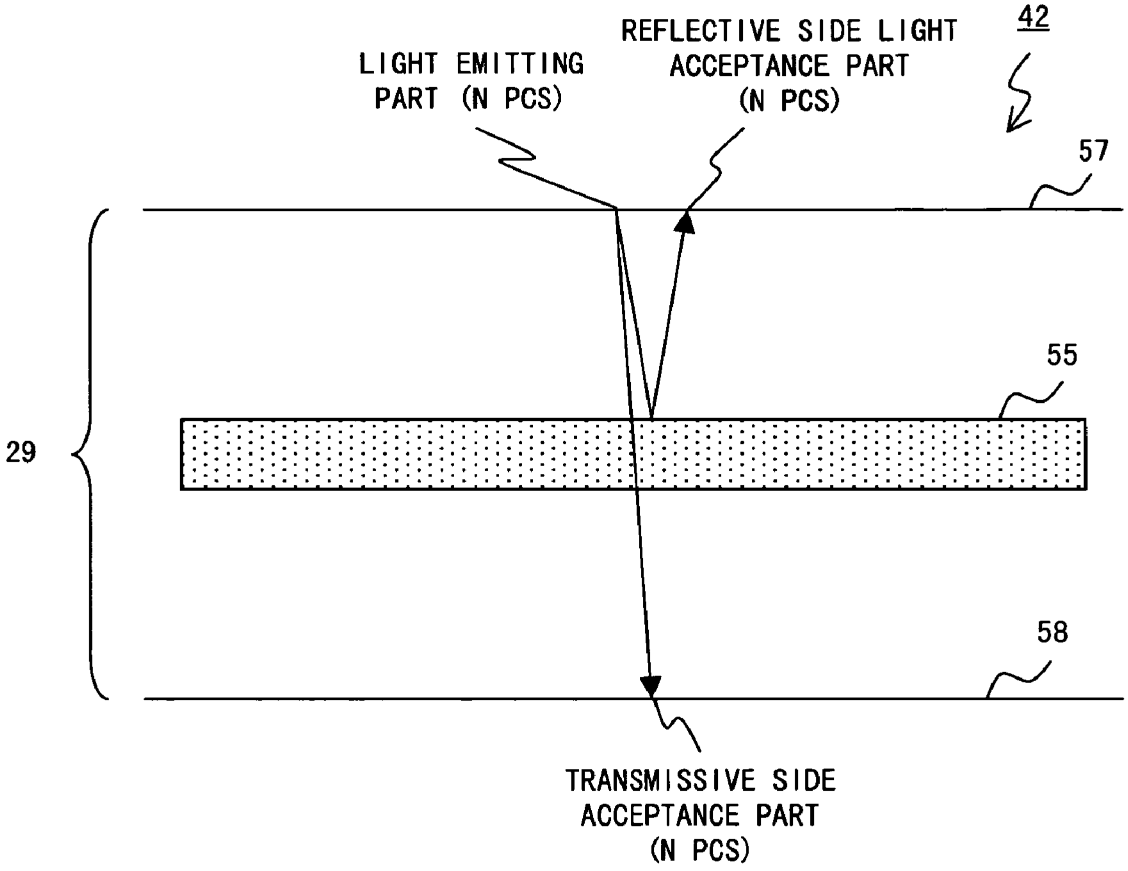
FIG. 4 is a view showing the model of a construction of a light sensor part of the paper sheets processor in the embodiment.

FIG. 4 is a view showing a model of a construction of the foregoing light sensor part 42. FIG. 4 is a cross section of a region wherein the light sensor part 42 is arranged, when the judgment part 29 of FIG. 3 is viewed in the direction of the arrow B. As shown in FIG. 4, the light sensor part 42 is constructed from a reflective line light sensor 57 arranged at the upper judgment part 29 which is formed by a light emitting device array forming N pieces of light emitting parts and a light acceptance device array forming N pieces of reflection side light acceptance parts; and a transmissive line light sensor 58 arranged at the lower judgment part 29, which is formed by a light acceptance device array forming N pieces of transmission side light acceptance parts operating in sync with light emitting of the foregoing N pieces of light emitting parts.

Due to the construction of this light sensor part 42, the measurement part which is segmentalized into the minute regions of the paper sheet 55 measured by the light sensor 42 is detected whether it is transparent or opaque. Further, when it is opaque, luminance of the opaque part is concurrently detected, and thereby presence of a corner fold is determined as described later.

Figure 5A:
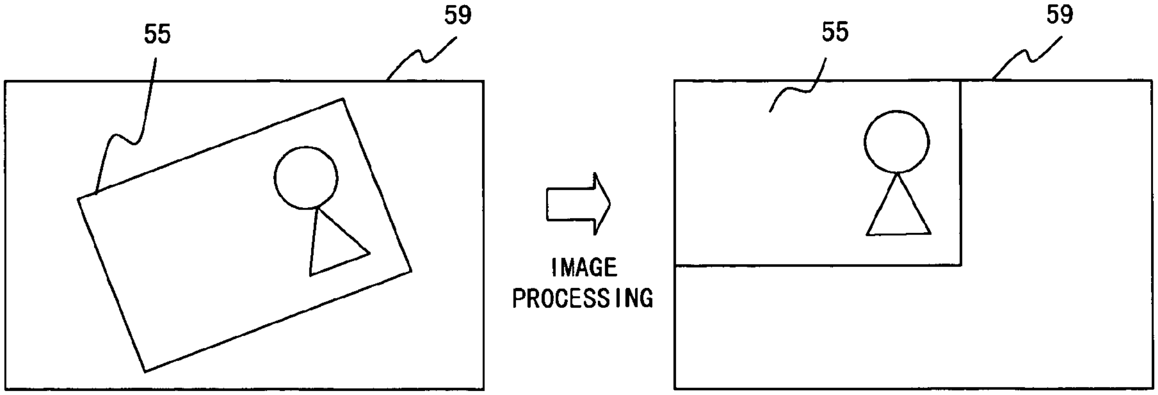
FIG. 5A is a view explaining the process in an image processing part of the paper sheets processor in the embodiment.
Figure 5B:
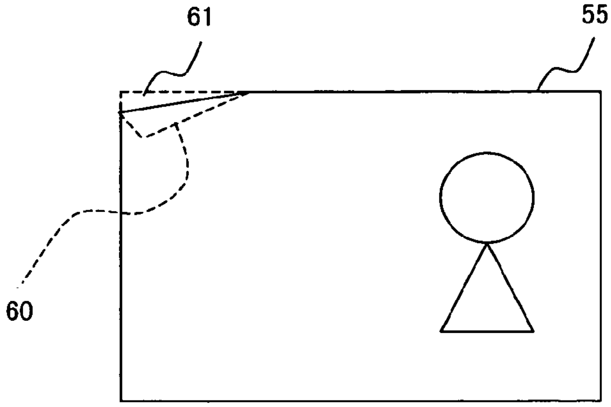
FIG. 5B is a view showing an example wherein a corner fold arises in paper sheet image data provided with image processing.

FIG. 5A is a view for explaining the process in the image processing part 51. FIG. 5B is a view showing an example wherein a corner fold arises in a paper sheet image data after image processing. As shown in the left of FIG. 5A, a light sensor raw image of the paper sheet 55 detected at the light sensor part 42 is biased in general, and its reference origin often does not correspond with the reference origin on an image processing region 59 in the image processing part 51. The light sensor raw image herein represents the image data after image processing in the image processing part 51 described in FIG. 2.

The image processing part 51 extracts an end point (upper left corner of the paper sheet 55 in this example) of the sensor raw image (left figure of FIG. 5A) of the paper sheet 55 biased when carried, and corrects position data of each pixel of the sensor raw image by using this end point as a reference point so that this reference point becomes the reference point (upper left corner of the image processing region 59 in this example)(see right figure of FIG. 5A).

Thereby, comparative judgment with the template data becomes easy. Further, it becomes possible to easily extract the light image on the corner part of the paper sheet 55, and determine presence of a minute corner fold 60 of the paper sheet 55 as shown in FIG. 5B, which is characteristic in the invention.

That is, an upper left corner part 61 of the original paper sheet 55 with no corner fold 60 shown in FIG. 5B is a part whose luminance by reflective light should be detected at the reflective line light sensor 57 in measurement by the light sensor part 42 shown in FIG. 4. However, since the corner fold 60 arises, the reflective light is not detected by the reflective line light sensor 57, and transmissive light is detected by the transmissive line light sensor 58. Thereby, presence of the corner fold (or presence of break) is determined.

Figure 6A:
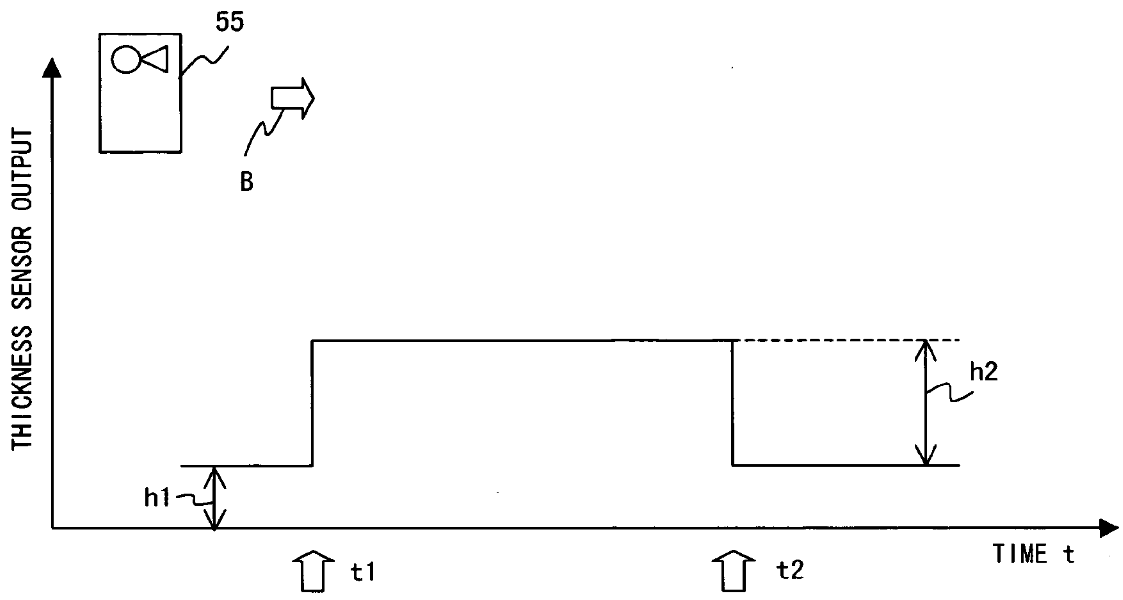
FIGS. 6A and 6B are views showing the wave forms of detection data output, which is detected by a thickness sensor part of the paper sheets processor in the embodiment.
Figure 6B:
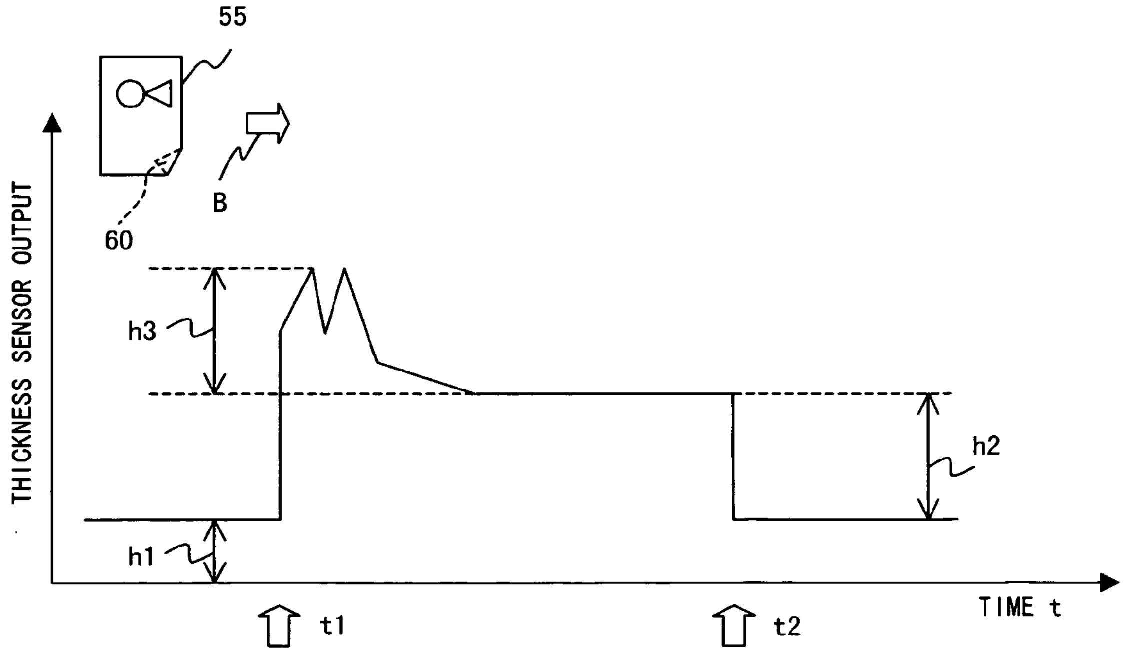

FIGS. 6A and 6B are views showing wave forms of detection data, which is detected by the thickness sensor part 43 and output from the A/D conversion part 53 to the corner fold determination part 54. In FIGS. 6A and 6B, the horizontal axis represent time t and the vertical axis represent thickness outputs of digital data.

FIG. 6A shows a case wherein the paper sheet 55 has no corner fold. The output wave form shown in FIG. 6A is obtained while this paper sheet 55 is carried in the carrying direction indicated by arrow B, is carried into and passes the judgment part 29. Output h1 shown in FIG. 6A represents an offset part. Output h2 higher than the output h1 of this offset part from paper sheet carrying-in time t1 to paper sheet carrying-out time t2 represents a thickness of the paper sheet 55.

Meanwhile, FIG. 6B represents a case wherein the paper sheet 55 has the corner fold 60 in the front end part of the paper sheet 55 in the carrying direction. When this paper sheet 55 with the corner fold 60 is carried in the carrying direction indicated by the arrow B and carried into the judgment part 29, output h3 higher than the thickness output h2 of the original paper sheet 55 appears in a state of waves from its paper sheet carrying-in time t1 to the time in the vicinity thereof. Thereby, it is clarified that the corner fold 60 exists in the front end part of the paper sheet 55 in the carrying direction.

Figure 7A:
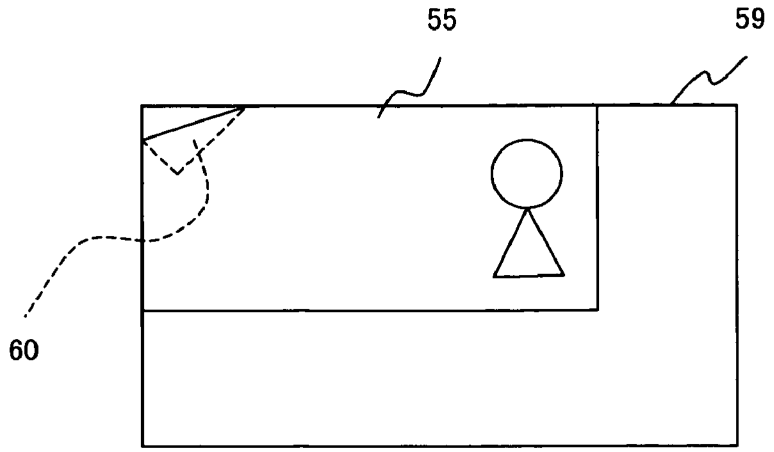
FIG. 7A is a view showing the image state when a corner fold exists in the back end part of a paper sheet in the carrying direction.
Figure 7B:
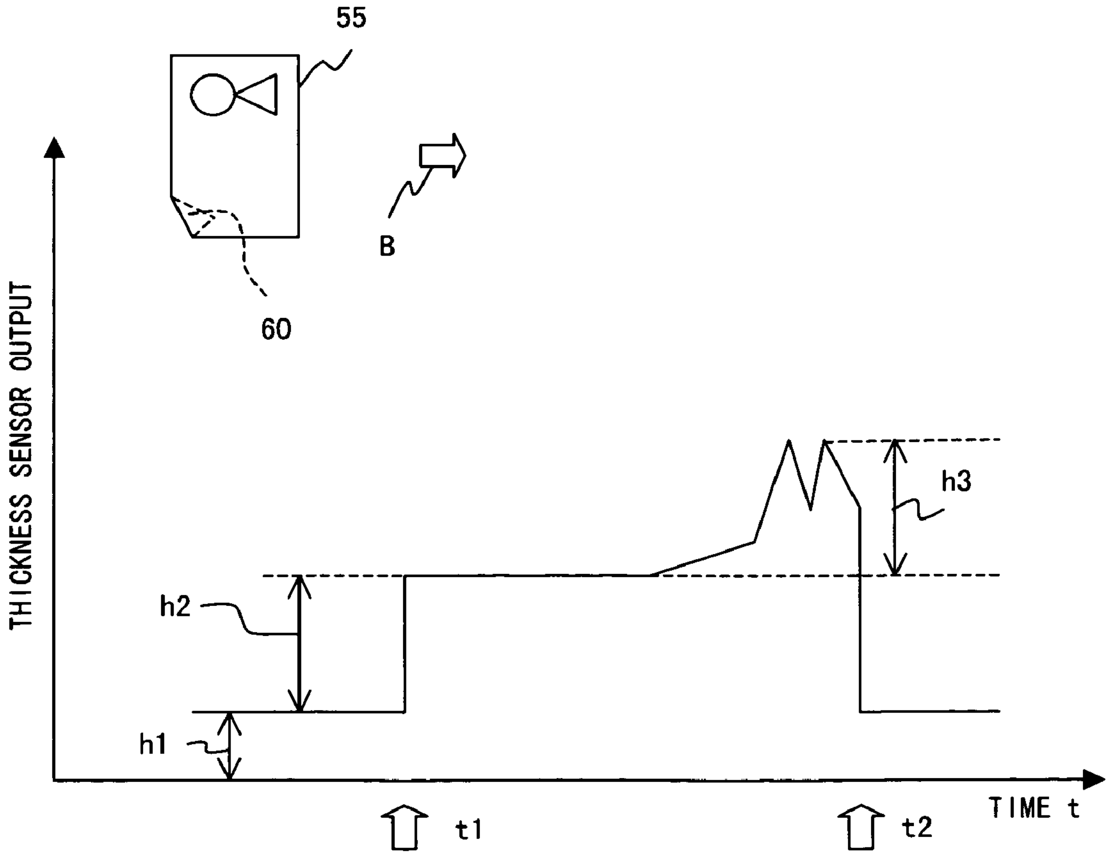
FIG. 7B is a view showing the output wave form of the thickness sensor then.

FIGS. 7A and 7B are views for explaining a case wherein the corner fold 60 exists in the back end part of the paper sheet 55 in the carrying direction. FIG. 7A shows a state that there is a corner fold 60 in the upper left corner of the paper sheet 55 as shown in FIG. 5B, and its light sensor image is provided with skewing correction and origin (reference point) correction.

As shown in FIG. 7B, when this paper sheet 55 is carried in a state that the corner fold 60 is located at the back end part in the carrying direction indicated by arrow B and carried in the judgment part 29, an output of sum of output h1 of the offset part and thickness output h2 of the paper sheet 55 appears from its paper sheet carrying-in time t1 for a certain time. Then, output h3 higher than the thickness output h2 of the original paper sheet 55 appears in a state of waves from time zone in the vicinity of the paper sheet carrying-out time t2 to the paper sheet carrying-out time t2. Thereby, it is clarified that the corner fold 60 exists in the back end part of the paper sheet 55 in the carrying direction.

Figure 8:
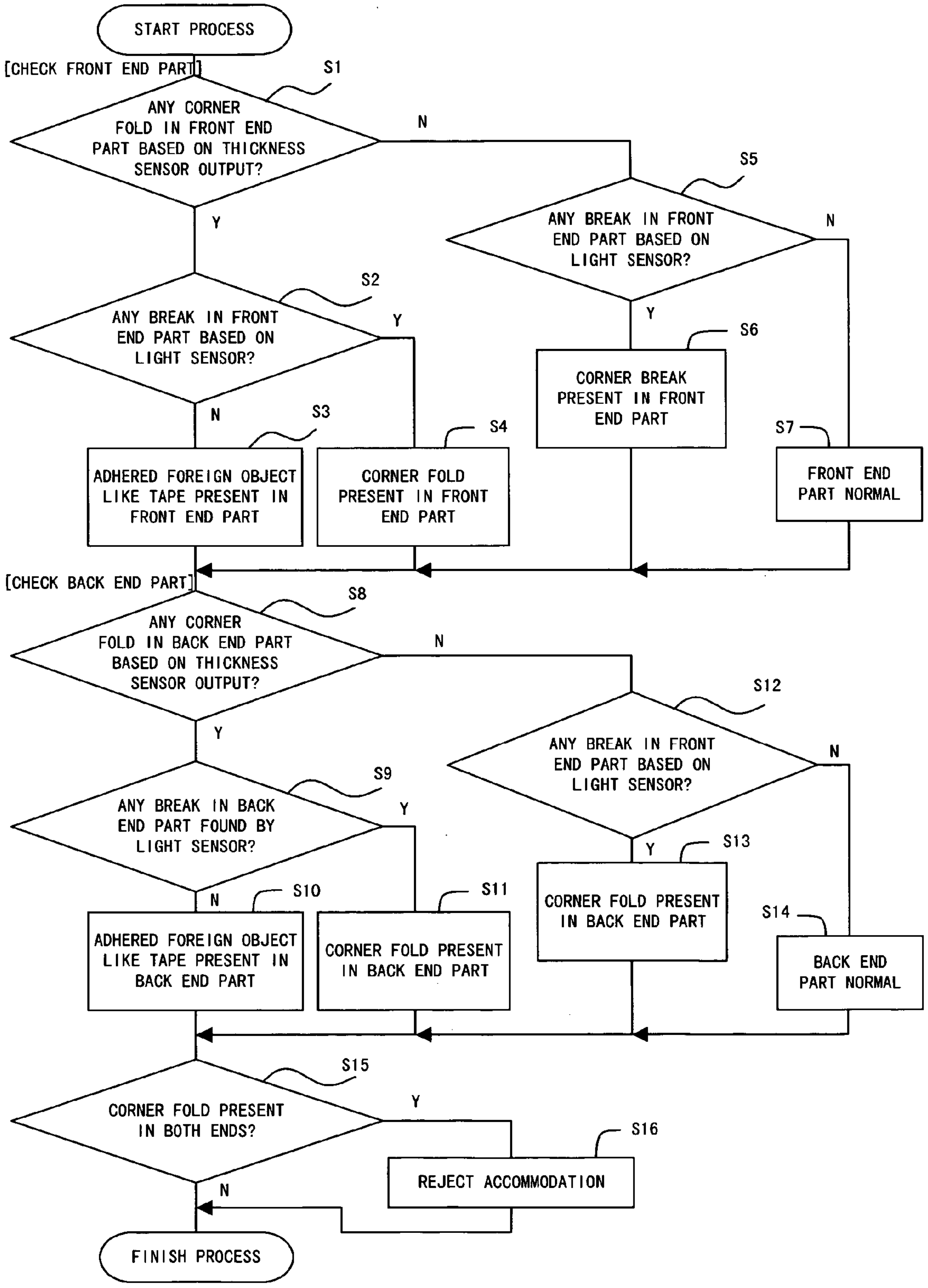
FIG. 8 is a flowchart showing an operation of processes of detection of a paper sheets condition whether a corner fold exists or not, which is performed by the central processor of the paper sheets processor in the embodiment.

FIG. 8 is a flowchart showing the operation of processes of detecting presence of a corner fold, which is performed by the central processor 38. In the same figure, first, whether a corner fold exists or not in the front end part of the paper sheet 55 in the carrying direction is determined, based on an output of the thickness sensor part 43 (S1). This process is a process for determining whether the output wave form as shown in FIG. 6B appears or not.

Then, when it is determined that the corner fold exists, based on the output of the thickness sensor part 43 (determination result of S1: Y), whether a break exists or not in the front end part of the paper sheet 55 in the carrying direction is subsequently determined, based on an output of the light sensor part 42 (S2). This process is a process for determining whether a detection output by the transmissive line light sensor 58 described in FIG. 4 exists or not.

Then, when it is determined that there is no break, that is, there is no detection output of the transmissive line light sensor 58 and there is a detection output of the reflective line light sensor 57 (determination result of S2: N), it is determined that the thickness change detected by the thickness sensor 43 in Process S1 is not caused by a corner fold, but caused by a foreign object such as a tape used for mending a break or the like adhered to the paper sheet (S3). In this case, the flow is forwarded to the next Process S8 as no corner fold.

In the case that in the foregoing Process 2, there is a break, that is, there is no detection output of the reflective line light sensor 57 and there is a detection output of the transmissive line light sensor 58 (determination result of S2: Y), it means the thickness change detected by the thickness sensor part 43 in Process S1 is a corner fold. In this case, it is determined that there is a corner fold in the front end part of the paper sheet 55 in the carrying direction (S4), and the flow is forwarded to the next Process S8.

In the foregoing Process S1, when there is no corner fold based on an output of the thickness sensor part 43 (determination result of S1: N), whether a break exists or not in the front end part of the paper sheet 55 in the carrying direction is subsequently determined by an output of the light sensor part 42 (S5). This process is also a process for determining whether a detection output by the transmissive line light sensor 58 described in FIG. 4 exists or not.

When a break exists (determination result of S5: Y), it is determined that there is a corner break in the front end part of the paper sheet 55 in the carrying direction (S6). In this case, the flow is forwarded to the next Process S8 as no corner fold.

When in the foregoing Process S5, there is no break (determination result of S5: N), it is determined that the front end part of the paper sheet 55 in the carrying direction is in a normal state that there is no corner fold (S7). The flow is forwarded to the next Process S8.

Subsequent Processes S8 to S14 are the same processes as the foregoing processes S1 to S7, except that a region wherein presence of a corner fold is determined is changed from the front end part of the paper sheet 55 in the carrying direction to the back end part of the paper sheet 55 in the carrying direction.

Thereby, when Process S10, S11, or S14 is finished, determination is established whether there is a corner fold in the front end part of the paper sheet 55 in the carrying direction, in the back end part of the paper sheet 55 in the carrying direction, or in the both end parts in the carrying direction.

Following this establishment of the determination whether a corner fold exists or not, it is determined whether the established determination represents that corner folds exist in the both end parts of the paper sheet 55 in the carrying direction or not (S15). When corner folds do not exist in the both end parts of the paper sheet 55 in the carrying direction (determination result of S15: N), this determination process is immediately finished. Meanwhile, when paper folds exist in the both end parts of the paper sheet 55 in the carrying direction (determination result of S15: Y), control is made so that this paper sheet 55 is carried to the reject part (reject box 33 or pay-in/out part 27) (S16). After that, this determination process is finished.

Figure 9A:
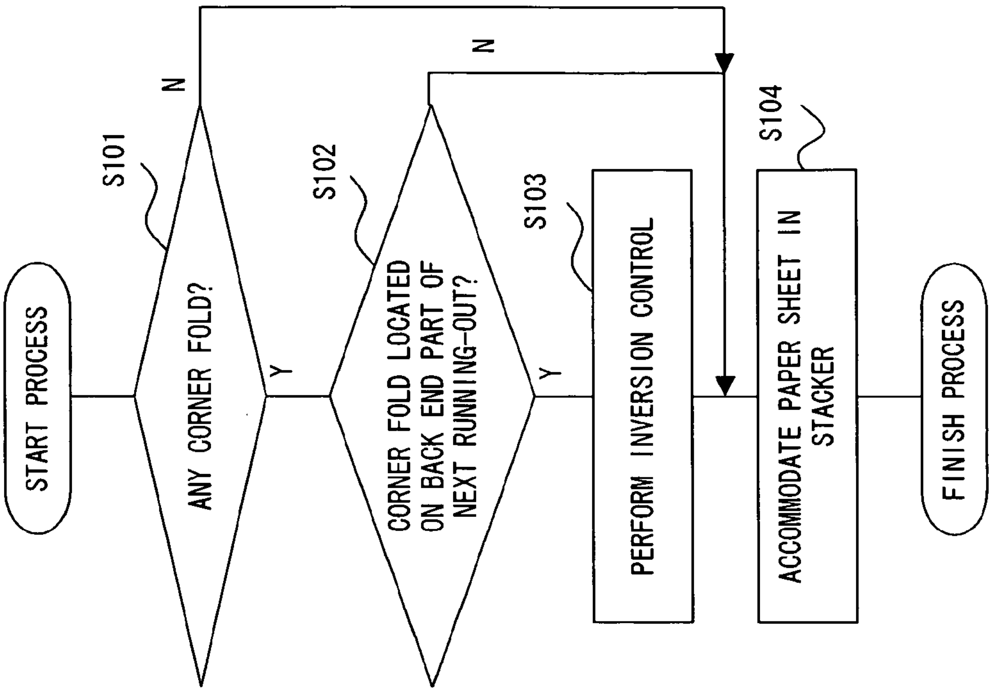
FIGS. 9A and 9B are flowcharts showing processing operations of accommodating paper sheets into a paper sheets accommodation part, which follows the processes of detection of a paper sheets condition whether a corner fold exists or not.
Figure 9B:
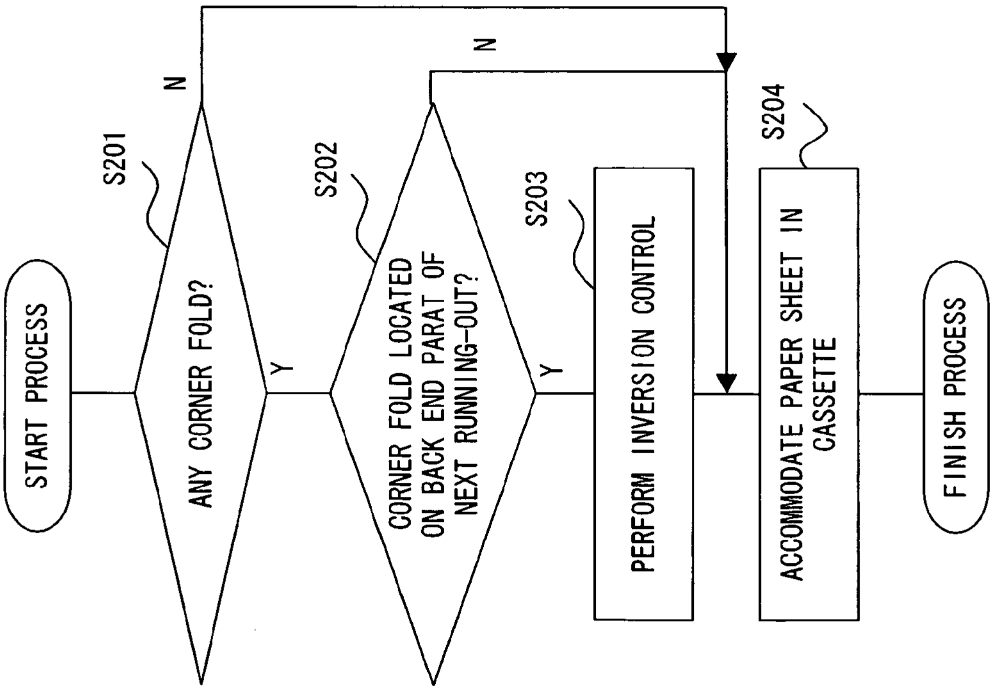

FIGS. 9A and 9B are flowcharts showing process operations in accommodating the paper sheet 55 in the paper sheets accommodation part 34 or 35, following the foregoing process of detection of whether a corner fold exists or not. FIG. 9A shows an example of a case wherein the paper sheets accommodation part 34 or 35 is constructed from a stacker.

In FIG. 9A, first, it is determined whether the foregoing established determination whether a corner fold exists or not is that a corner fold is present or not (S101). When a corner fold is present (determination result of S101: Y), it is determined whether or not the position of the corner fold is in a position becoming the back end side in the running-out direction when the paper sheet 55 is accommodated in the paper sheets accommodation part 34 or 35, and then run out from the paper sheets accommodation part 34 or 35 next time (S102).

Then, when the corner fold is in a position becoming the back end part in the running-out direction next time (determination result of S102: Y), it is possible that double feed is caused at the next running out occasion as shown in FIG. 11. Therefore, in this case, after the paper sheet 55 with the corner fold is carried to the inversion control part 30 to inverse orientation of the paper sheet 55 in the carrying direction (S103), the paper sheet 55 is accommodated in the stacker of the paper sheets accommodation part 34 or 35.

Thereby, when this paper sheet 55 with the corner fold is accommodated in the stacker of the paper sheets accommodation part 34 or 35 and run out next time, based on the foregoing orientation inversion, the corner fold part is located on the front end part in the running-out direction. Therefore, there is no possibility of double feed.

When in the Process S102, the region wherein the corner fold arises in the paper sheet 55 is not on the back end part in the running-out direction in the next time, that is, on the front end part (determination result of S102: N), there is no possibility of double feed in the next running-out time. Therefore, in this case, the flow is immediately forwarded to Process S104.

Next, processes shown in FIG. 9B show an example of a case wherein the paper sheets accommodation part 34 or 35 is constructed from a cassette. Processes S201 to 204 of FIG. 9B are the same as Processes S101 to S104 of FIG. 9A, except that the component of the paper sheets accommodation part 34 or 35 is changed from the stacker to the cassette.

As described above, the actual corner fold and the region where the corner fold arises are surely detected without being misidentified as a mending or a break by using the paper sheets corner fold detection method and the paper sheets corner fold detection program of the invention for the paper sheets processor. Therefore, it becomes possible to perform orientation inversion so that no trouble is caused in the subsequent processes. Further, it becomes possible to provide a highly reliable paper sheets processor with a low pause ratio, which operates stably.

In particular, round-the-clock paper sheets processors in unmanned stores have been common recently. Therefore, existence of a highly reliable paper sheets processor with a low pause ratio, which operates stably is extremely beneficial.

Further, the series of processes described above are performed on a program. Therefore, as long as a paper sheets processor comprises a light sensor and a thickness sensor, the invention is a superior technique capable of being easily applied to already shipped processors as well.

In this case, when the paper sheet processor has no space to additionally arrange a device for performing orientation inversion of corner fold paper sheets, it is possible that paper sheets with a corner fold on the end part, which might cause double feed in the next running-out occasion from an accommodation part are all accommodated in a reject part.

What is claimed is:

1. A paper sheets corner fold detection method implemented by a paper sheets processor, the method using: a carrying-in sensor part for being started by input operation from outside to a transaction start switch part and detecting insertion of a paper sheet inserted from outside for transaction; a light sensor part for detecting light reflective characteristics or light transmissive characteristics of the paper sheet, which passes the carrying-in sensor part and is carried; and a thickness sensor part for detecting a thickness change of the paper sheet, which passes the carrying-in sensor part and is carried, the method comprising:

an image processing step for image-processing a detection output value from the light sensor part by an image processing part;

an image corner fold determination step for determining whether a corner fold exists or not in the front end part or the back end part of the paper sheet in the carrying direction based on image data processed by the image processing step;

a thickness corner fold determination step for determining whether a corner fold exists or not in the front end part or the back end part of the paper sheet in the carrying direction based on a detection output value from the thickness sensor part; and a paper sheet corner fold determination step for determining whether a corner fold exists or not in the front end part or the back end part of the paper sheet in the carrying direction based on the image corner fold determination step and the thickness corner fold determination step; and a control step for controlling ejection carrying of the paper sheet so that the paper sheet is separately accommodated in a reusable paper sheets accommodation part, a pre-accommodation inversion part, or an unusable paper sheets accommodation part according to a region where a corner fold exists when it is confirmed that the corner fold exists in the paper sheet in the paper sheets corner fold determination step.

2. The paper sheets corner fold detection method according to claim 1, wherein when the corner fold of the paper sheet confirmed in the paper sheets corner fold determination step is located in a region wherein double running-out is not caused by the corner fold when the paper sheet is run out from the reusable accommodation part next time, the ejection carrying is controlled so that the paper sheet is accommodated in the reusable paper sheets accommodation part as it is in the control step.

3. The paper sheets corner fold detection method according to claim 1, wherein when the corner fold of the paper sheet confirmed in the paper sheets corner fold determination step is located in a region wherein double running-out may be caused by the corner fold when the paper sheet is run out from the reusable paper sheets accommodation part next time, the ejection carrying is controlled so that the paper sheet is accommodated through the pre-accommodation inversion part into the reusable paper sheets accommodation part in the control step.

4. The paper sheets corner fold detection method according to claim 1, wherein when the corner fold of the paper sheet confirmed in the paper sheets corner fold determination step is located in both of the front end part and the back end part of the paper sheet in the carrying direction, the ejection carrying is controlled so that the paper sheet is accommodated in the unusable paper sheets accommodation part in the control step.

5. The paper sheets corner fold detection method according to claim 1, wherein the reusable paper sheets accommodation part is constructed from a stacker or a cassette.

6. A storage medium storing a raper sheets corner fold detection program for execution on a computer to perform a paper sheets corner fold detection process in a paper sheets processor using:

a carrying-in sensor part activated by an input operation from outside wherein a transaction start switch part detect insertion of a paper sheet inserted from outside for a transaction; a light sensor part for detecting light reflective characteristics or light transmissive characteristics of the paper sheet, which passes the carrying-in sensor part and is carried; and a thickness sensor part for detecting a thickness change of the paper sheet, which passes the carrying-in sensor part and is carried, and further comprising:

a process for image-processing a detection output value from the light sensor part by an image processing part;

an image corner fold determination process for determining whether a corner fold exists or not in the front end part or the back end part of the paper sheet in the carrying direction based on image data processed by the said process;

a thickness corner fold determination process for determining whether a corner fold exists or not in the front end part or the back end part of the paper sheet in the carrying direction based on a detection output value from the thickness sensor part;

a paper sheets corner fold determination process for determining whether a corner fold exists or not in the front end part or the back end part of the paper sheet in the carrying direction based on the image corner fold determination process and the thickness corner fold determination process; and a control process for controlling ejection carrying of the paper sheet so that the paper sheet is separately accommodated in a reusable paper sheets accommodation part, a pre-accommodation inversion part, or an unusable paper sheets accommodation part according to a region where a corner fold exists when it is confirmed that the corner fold exists in the paper sheet in the paper sheets corner fold determination process.

7. The storage medium storing a paper sheets corner fold detection program for execution on a computer according to claim 6 further comprising:

a process for controlling the ejection carrying so that the paper sheet is accommodated in the reusable paper sheets accommodation part as it is in the control process, when the corner fold of the paper sheet confirmed in the paper sheets corner fold determination process is located in a region wherein double running-out is not caused by the corner fold when the paper sheet is run out from the reusable paper sheets accommodation part next time.

8. The storage medium storing a paper sheets corner fold detection program for execution on a computer according to claim 6 further comprising:

a process for controlling the ejection carrying so that the paper sheet is accommodated through the pre-accommodation inversion part into the reusable paper sheets accommodation part in the control process, when the corner fold of the paper sheet confirmed in the paper sheets corner fold determination process is located in a region wherein double running-out may be caused by the corner fold when the paper sheet is run out from the reusable paper sheets accommodation part next time.

9. The storage medium storing a paper sheets corner fold detection program for execution on a computer according to claim 6 further comprising:

a process for controlling the ejection carrying so that the paper sheet is accommodated in the unusable paper sheets accommodation part in the control process, when the corner fold of the paper sheet confirmed in the paper sheets corner fold determination process is located in both of the front end part and the back end part of the paper sheet in the carrying direction.

10. A method comprising:

generating a detection output value based on detecting light reflective characteristics or light transmissive characteristics and detecting a thickness change of a paper sheet;

determining whether or not a corner fold exists in a front end portion or a back end portion of the paper sheet in a carry-in direction based on the detected light reflective characteristics or light transmissive characteristics;

determining whether or not a corner fold exists in the front end portion or the back end portion of the paper sheet in the carry-in direction based on the detected thickness change the paper sheet;

determining whether or not a corner fold exists in the front end portion or the back end portion of the paper sheet in the carry-in direction based on the detected light reflective characteristics or light transmissive characteristics and the detected thickness change the paper sheet; and controlling ejection carrying of the paper sheet in a control part so that the paper sheet is separately accommodated in a reusable paper sheets accommodation part, a pre-accommodation inversion part, or an unusable paper sheets accommodation part depending upon a region where a corner fold exists on a paper sheet based upon the determination or whether or not a corner fold exits.

11. The method according to claim 10 further comprising:

controlling the ejection carrying wherein when the corner fold of the paper sheet, determined by the paper sheets corner fold determination, located in a region wherein double running-out is not caused by the corner fold when the paper sheet is run out from the reusable accommodation part, the ejection carrying is controlled so that the paper sheet is accommodated in the reusable paper sheets accommodation part as it is in the control part.

12. The method according to claim 10 further comprising:

controlling the ejection carrying wherein when the corner fold of the paper sheet, determined by the paper sheets corner fold determination step, is located in a region wherein double running-out may be caused by the corner fold when the paper sheet is run out from the reusable paper sheets accommodation part, the ejection carrying is controlled so that the paper sheet is accommodated through the pre-accommodation inversion part into the reusable paper sheets accommodation part in the control part.

13. The method according to claim 10 further comprising:

controlling the ejection carrying wherein when the corner fold of the paper sheet confirmed in the paper sheets corner fold determination step is located in both of the front end part and the back end part of the paper sheet in the carrying direction, the ejection carrying is controlled so that the paper sheet is accommodated in the unusable paper sheets accommodation part in the control part.

* * * * *

UNITED STATES PATENT AND TRADEMARK OFFICE

CERTIFICATE OF CORRECTION

PATENT NO. : 7,131,539 B2

APPLICATION NO. : 11/046779

DATED : November 7, 2006

INVENTOR(S) : Masanori Mukai

It is certified that error appears in the above-identified patent and that said Letters Patent is hereby corrected as shown below:

Column 15, Line 1, change “raper” to --paper--.

Column 15, Line 7, change “detect” to --detects--.

Signed and Sealed this

Sixth Day of March, 2007

JON W. DUDAS

*Director of the United States Patent and Trademark Office*